United States Patent
Gardner et al.

(10) Patent No.: US 6,839,485 B2
(45) Date of Patent: Jan. 4, 2005

(54) OPTICAL DEVICE FOR COMPENSATION OF MULTIPLE WAVELENGTHS AND WORKING DISTANCES IN DUAL-FIBER COLLIMATORS

(75) Inventors: Timothy S. Gardner, Eden Prairie, MN (US); Ronald E. Gerber, Richfield, MN (US); Jeffrey P. Treptau, Lakeville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/207,564

(22) Filed: Aug. 29, 2002

(65) Prior Publication Data

US 2004/0042719 A1 Mar. 4, 2004

(51) Int. Cl.[7] .................................................. G02B 6/32
(52) U.S. Cl. .............................. 385/33; 372/6; 385/31
(58) Field of Search .............................. 385/31–33, 29, 385/34; 372/6; 398/88

(56) References Cited

U.S. PATENT DOCUMENTS

| | | | | |
|---|---|---|---|---|
| 5,917,626 A | * | 6/1999 | Lee | 398/88 |
| 5,980,117 A | * | 11/1999 | Feuer et al. | 385/78 |
| 6,084,994 A | * | 7/2000 | Li et al. | 385/31 |
| 6,185,347 B1 | * | 2/2001 | Zheng | 385/34 |
| 6,198,858 B1 | * | 3/2001 | Pan et al. | 385/24 |
| 6,567,586 B2 | * | 5/2003 | Brophy et al. | 385/33 |
| 2002/0094162 A1 | * | 7/2002 | Li et al. | 385/34 |
| 2002/0106153 A1 | * | 8/2002 | Wu et al. | 385/33 |
| 2002/0181865 A1 | * | 12/2002 | Jang et al. | 385/34 |
| 2003/0021531 A1 | * | 1/2003 | Brophy et al. | 385/33 |

* cited by examiner

*Primary Examiner*—Tuyet Vo
*Assistant Examiner*—Hung Tran Vy
(74) *Attorney, Agent, or Firm*—Carlson, Caspers, Vandenburgh & Lindquist

(57) ABSTRACT

A particular focusing arrangement in a dual fiber collimator improves the transmission efficiency and ease of alignment of the collimator. In particular, the collimator includes two optical fibers mounted in a dual-fiber ferrule. The fiber end-faces are co-planar with the angle-polished end-face of the ferrule and displaced along the optical axis of the ferrule. The collimator unit also includes a first focusing element centered along the optical axis of the ferrule and positioned such that its back front focal point is between the two end faces of the fibers. An advantage provided by this arrangement is that by changing the fiber polish angle and polish azimuth, relative to a line connecting the fiber centers, superior coupling from one fiber to the other can be achieved, even with different working distances and at various wavelengths.

22 Claims, 4 Drawing Sheets

OPTICAL DEVICE FOR COMPENSATION OF MULTIPLE WAVELENGTHS AND WORKING DISTANCES IN DUAL-FIBER COLLIMATORS

FIELD OF THE INVENTION

The present invention is directed generally to fiber optic communications systems, and more particularly to techniques to compensate for multiple wavelengths and working distances in dual-fiber components in such systems.

BACKGROUND

In the field of fiber optic communications, information is transmitted optically over a network of single-mode or multi-mode fibers. Many of the switching and splitting functions in these networks are accomplished in free space, where the light may exit the fiber and interact with active and/or passive optical components. In some instances, it may be necessary to collimate the optical beam exiting the fiber for efficient interaction with the external components. Also, in some cases the optical fibers carry multiple channels at different optical wavelengths and the collimating optics may need to accommodate multiple wavelengths simultaneously.

When preparing a break in an optical communication link, it is common practice to insert the exposed fiber optic into an optical ferrule for protection of the delicate glass fiber. There are applications where it may be desirable to have two or more such fibers in the same ferrule transmitting and/or receiving at different optical wavelengths, or at the same wavelength.

Given the above, there is a need for an optical collimating device incorporating a multi-port ferrule which can simultaneously accommodate multiple optical wavelengths.

SUMMARY OF THE INVENTION

Generally, the present invention is directed to improving the transmission efficiency and ease of alignment of multiple wavelength dual-fiber collimator devices.

The invention is directed to a collimator unit that includes two optical fibers mounted in a dual-fiber ferrule, the fiber end-faces are co-planar with the angle-polished end-face of the ferrule and displaced along the optical axis of the ferrule. The collimator unit also includes a first focusing element centered along the optical axis of the ferrule and positioned such that its front focal point is between the two fibers end-face.

In one aspect of the invention, the input signal to the collimator unit enters through the fiber furthest from the collimator lens. The output of the collimator lens is partially reflected by an optical filter placed at the back focus of the collimator lens and focused back through the collimator lens into the output fiber mounted adjacent to the input fiber in the dual-fiber ferrule. In this embodiment, the input fiber end-face is positioned slightly outside the front focal plane of the collimating lens, and therefore the optical beam emerging from the collimator lens towards the filter is nearly collimated but slightly converging. An advantage provided by this arrangement is that by changing the fiber polish angle and polish azimuth, relative to a line connecting the fiber centers, superior coupling from one fiber to the other can be achieved, even with different working distances and at various wavelengths.

One particular embodiment of the invention is directed to a dual fiber collimator unit that includes a dual-fiber ferrule having an angled end face and having a ferrule axis. First and second optical fibers are mounted in the ferrule with respective first and second fiber ends approximately coplanar with the angled end face. The first fiber end corresponds to a first position along the ferrule axis and the second fiber end corresponds to a second position along the ferrule axis different from the first position. A focusing unit having an optical axis coincident with the ferrule axis is set at a working distance between i) the focusing unit and ii) a working point along the ferrule axis between the first and second positions that is substantially equal to the front focal length of the focusing unit.

Another embodiment of the invention is directed to an optical system that has an optical transmitter producing output light in a signal wavelength band, an optical receiver receiving at least a portion of the output light; and an optical fiber link coupling between the optical transmitter and the optical receiver. The optical fiber link includes a fiber optic device having a dual fiber collimator that has a dual-fiber ferrule having an angled end face and a ferrule axis. First and second fibers are mounted in the ferrule with respective first and second fiber ends approximately coplanar with the angled end face. The first fiber end corresponds to a first position along the ferrule axis and the second fiber end corresponding to a second position along the ferrule axis different from the first position. A focusing unit has an optical axis coincident with the ferrule axis. A working distance between i) the focusing unit and ii) a working point along the ferrule axis between the first and second positions is substantially equal to the front focal length of the focusing unit.

Another embodiment of the invention is directed to a method of controlling light in a dual fiber collimator unit. The method includes propagating the light diverging from a first fiber, having a first fiber end, towards a focusing unit. The light from the first fiber is focused with the focusing unit so as to produce a convergent beam. The convergent beam is reflected and is focused with the focusing unit to a second fiber having a second fiber end disposed closer to focusing unit than the first fiber end.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
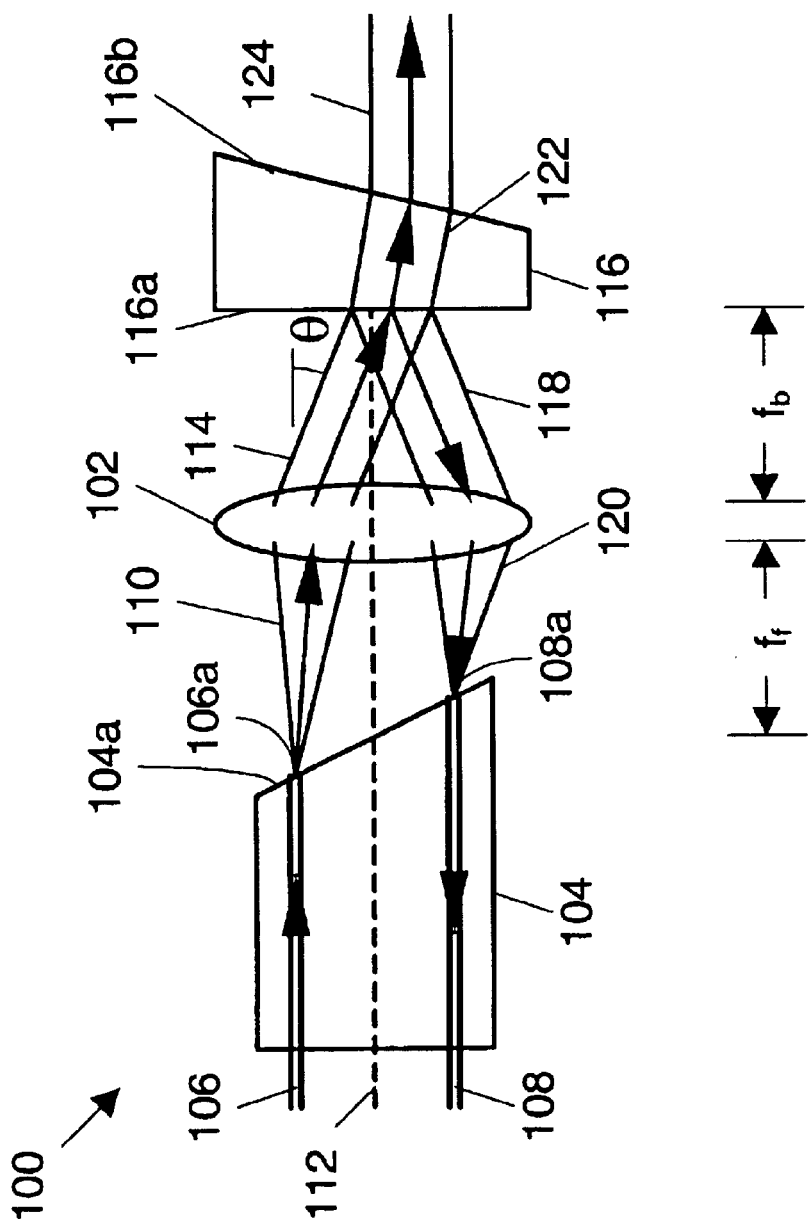
FIG. 1 schematically illustrates an embodiment of a three-port fiber optic filter unit according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to fiber optic communications systems, and is believed to be particularly suited to techniques to compensate for multiple wavelengths and working distances in dual-fiber components in such systems.

A dual-fiber collimator (DFC) assembly is an important building block for optical add/drop multiplexers, monitor arrays, and hybrid assemblies. An embodiment of a DFC 100 is shown in FIG. 1. The dual-fiber collimator 100 includes a first lens 102 and a dual-fiber ferrule 104. Two fibers 106 and 108 are held in the ferrule 104, with their ends 106a and 108a coplanar with the end-face 104a of the ferrule. The ferrule end 104a, and the fiber ends 106a and 108a may be angle-polished, thereby offsetting the fiber end-faces 106a and 108a along the optical axis 112 of the ferrule. The centerlines of the fibers 106 and 108 are also displaced transverse to the optical axis 112. A condensing lens 102, or condensing optical system, is centered along the optical axis 112 of the ferrule and is displaced along the optical axis 112 such that its front focus, $f_f$, lies between the ends of the optical fibers 106a and 108a. In this configuration, a first light beam 110, from the first fiber 106, passes through the lens 102 and is nearly collimated. However, since the end-face of fiber 106a is typically positioned at a distance greater than the front focal length of the condensing lens 102, the optical beam 114 exiting the condensing lens 102 converges at a small angle. This condition of a nearly collimated beam which is either converging to a focus or diverging at a small angle is hereafter referred to as a substantially collimated beam.

Typical optical communication devices utilize fibers have a 125 μm diameter and, when packaged in a dual-fiber ferrule, may be end-face polished nominally at 8 degrees. The convergence angle for such a device when utilizing a condensing lens with a focal length around 2 millimeters is around 0.2 degrees. Also, since the beam 110 is not positioned on the lens axis 112, the substantially collimated beam 114 propagates at an angle, θ, relative to the optical axis 112. For the device mentioned above with the fiber cores spaced center-to-center approximately 125 μm, the value of θ may be approximately 2 degrees.

The substantially collimated beam 114 is incident upon a filter 116, or other optical element, placed at a distance roughly equal to the back focal length, $f_b$, of the lens 102. The filter 116 reflects a portion of the beam 114 as a reflected beam 118, and transmits the remainder of the beam 114 as a transmitted beam 122. The reflected beam 118 is reflected to the first lens 102 which focuses the beam 120 to the second fiber 108.

The transmitted beam 122 passes through the filter 116 and exits through the back surface 116b of the filter 116. The wedge angle of the back surface 116b may be selected so that the exiting beam 124 propagates substantially parallel to the optical axis 112. The transmitted beam 122 exits the DFC unit 100 as a substantially collimated beam 124 nearly parallel to the optical axis 112 and may be coupled to other free space bulk optic components. This is described further in U.S. application Ser. No. 09/999,891, incorporated herein by reference. The wedge angle of the of the back surface 116b need not be selected so that the beam 124 propagates parallel to the axis 112.

Note that the decollimation of the beams 114 and 118 does not significantly affect the coupling of the fiber 106 to the fiber 108, because the front focal plane of the lens 102 typically falls midway between the ends of the fibers 106a and 108a. One can generally achieve the same coupling efficiency with this system as with a similar system in which both fiber ends 106a and 108a lie in the front focal plane of the lens 102.

The decollimation of the beams 114 and 124 can increase the coupling efficiency from fiber 106 to a fiber in a receiver module that is coupled to exiting beam 124. The polish angle and orientation of the ferrule face 104a are useful parameters when designing such a receiver system, and can be used to increase the coupling efficiency for a range of wavelengths and working distances (i.e. distances between the dual-fiber collimator 100 and a receiver module).

The element 116 may be a filter having a multilayer dielectric filter coating, typically on the first surface 116a, with the second surface 116b having an anti-reflection coating. The filter 116 may be, for example, a wavelength dependent beamsplitter. This is useful for multiplexing/demultiplexing, or adding or dropping channels in a WDM (wavelength division multiplexed) or DWDM (dense wavelength division multiplexed) optical communications system. The filter 116 may also split off a fraction of the incident light over the entire wavelength band of interest, for example to make a power measurement. The filter 116 may also perform other functions.

Figure 2:
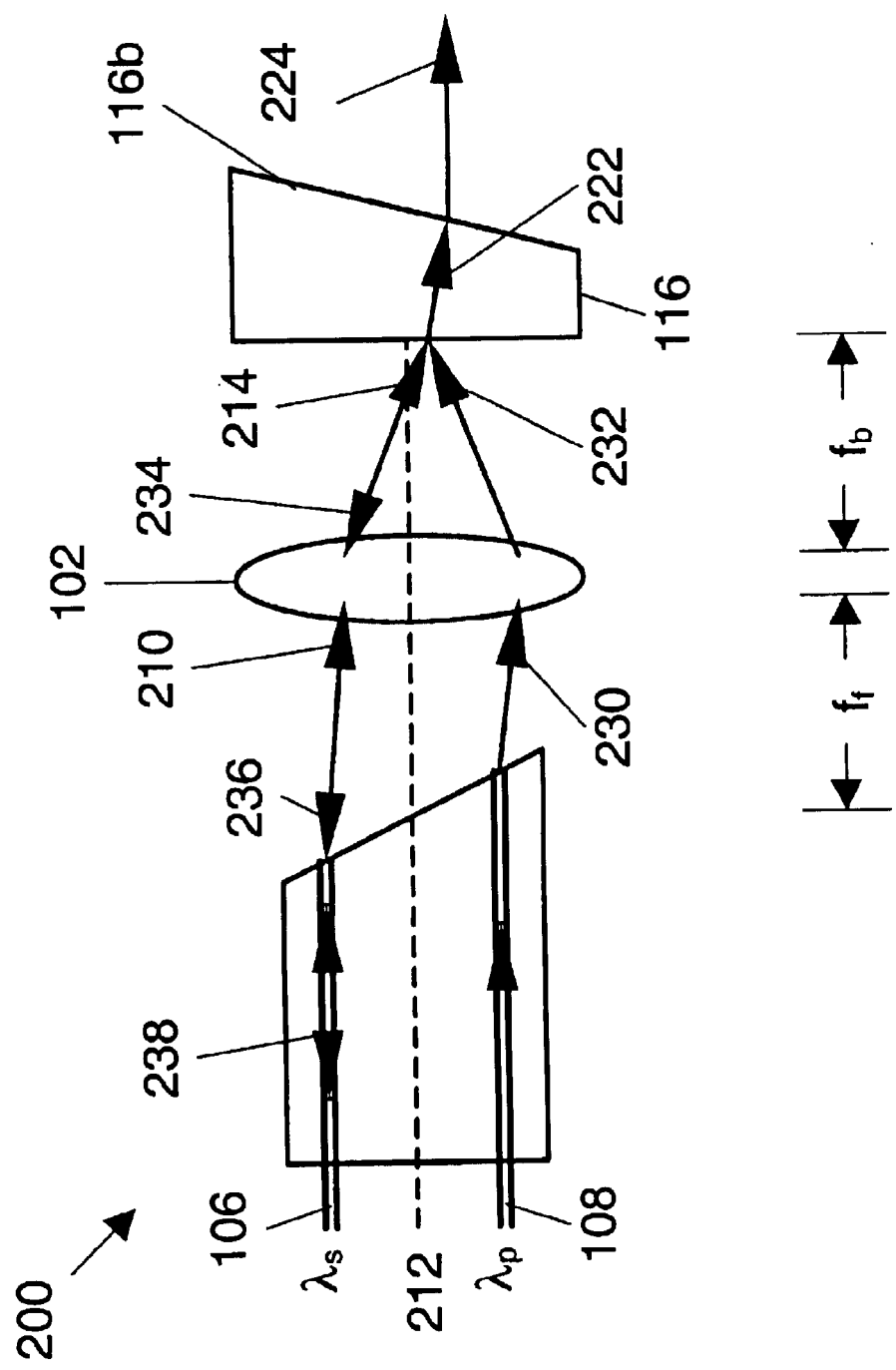
FIG. 2 schematically illustrates an embodiment of an optical fiber unit according to the present invention.

Another embodiment of a dual-fiber collimator device 200 is schematically illustrated in FIG. 2. The device includes components similar to those in device 100. However, device 200 may also be utilized as part of an optical amplifier where the input signal in fiber 108 may be used to amplify the main signal carried in fiber 106. In this mode, the communications input signal enters the device via fiber 106, where fiber 106 may include a section of an erbium-doped fiber amplifier. The input optical signal in fiber 108, hereafter referred to as the pump beam $\lambda_p$, is typically at a shorter wavelength/higher energy than the communications signal $\lambda_s$ in fiber 106.

In the illustrated embodiment, a signal light beam 210, from the first fiber 106, passes through the lens 102 and is collimated. However, since the beam 210 is not positioned on the lens axis 212, the collimated beam 214 propagates at a downward angle relative to the axis 212. For typical systems, the downward angle may be around 2°, depending on such factors as the focal length of the lens 102 and the separation between the two fibers 106 and 108. The collimated beam 214 is incident on the filter 116, which is placed at a distance approximately equal to the back focal length, $f_b$, of the lens 102. The filter 116 in this case may be a dichroic edge filter which transmits wavelengths in the range of the communications signal and reflects shorter wavelengths in the range of the pump signal. The communications main signal 222 passes through the filter 116 and is refracted on the back surface 116b of filter 116. The signal 224 may propagate parallel to the axis 212. The transmitted beam 224 exits the DFC device 200 and may be coupled to other free space bulk optical components.

The pump light beam 230 exits the fiber 108 and is collimated and redirected by lens 102. The output beam 232 of the collimating lens is incident upon filter 116 which reflects the pump beam 232. The reflected pump beam 234 is focused by lens 202 and the focused pump beam 236 is coupled into fiber 106. The coupled pump beam 238 is counter-propagating in the signal fiber 106 and in the region where fiber 106 is erbium-doped for amplification, the counter-propagating pump signal 238 may be used to amplify the main communications signal.

Figure 3:
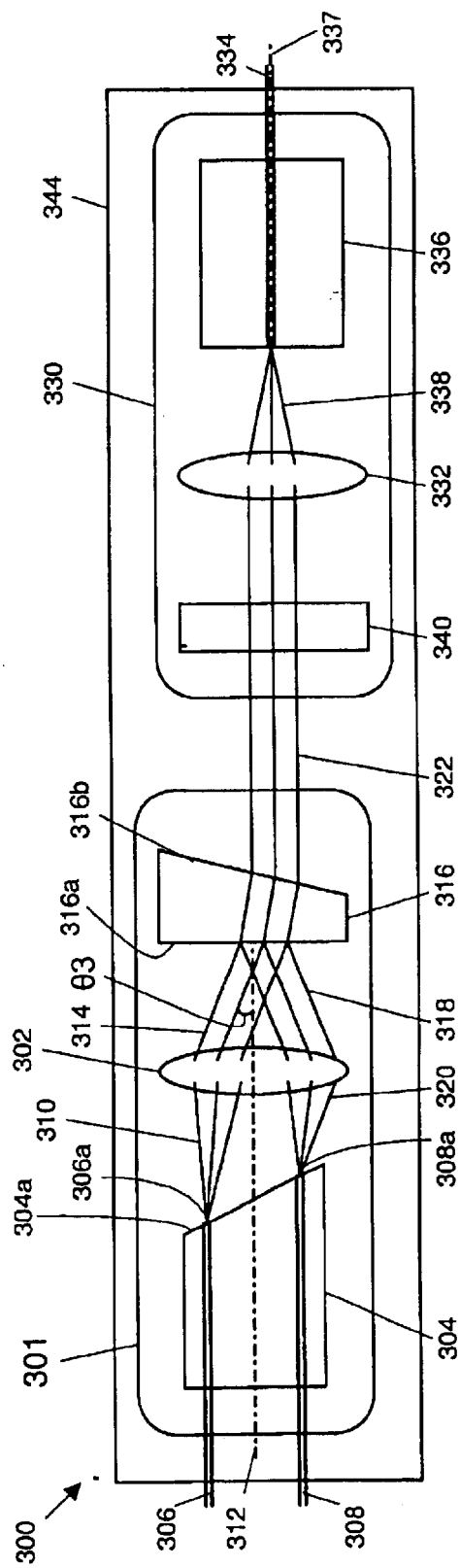
FIG. 3 schematically illustrates another embodiment of an optical fiber unit according to the present invention.

Another embodiment 300 of the invention is illustrated in FIG. 3, which shows a DFC 301 coupling light to a Single Fiber Collimator SFC 330. The DFC 301 includes two fibers 306 and 308 held in a dual-fiber ferrule 304. The ferrule end 304a and the fiber ends 306a and 308a may be polished at a small angle to prevent reflections feeding to other elements.

Beam 310 from the first fiber 306 diverges towards the lens 302. The lens 302 may be any suitable type of lens, such as a spherical or aspherical lens, having at least one curved surface, or may be a gradient index (GRIN) lens. Beam 314 propagating from the lens 302 is substantially collimated and, since the first fiber 306 is positioned at a distance from the axis 312 of lens 302, beam 314 propagates at an angle relative to the axis 312.

Beam 314 is incident on optical element 316, which reflects light as beam 318 to the lens 302 which redirects and focuses the beam 320 to the second fiber 308. The optical element 316 is wedged at an angle, for example greater than around 2°, and perhaps around 4°, so that refraction of the transmitted beam 322 directs the beam 322 along a direction substantially parallel to the optical axis 312 of the first lens 302, to the SFC 330. The transmitted beam 322 is focused by a lens 332 into a third fiber 334 held in a single fiber ferrule 336. In this embodiment, the axis 337 of the SFC 330 is substantially parallel to the axis 312 of the DFC 301, and the axis 337 of the SFC 330 is translated by a small amount off to the side from the axis 312 of the DFC 301. This device 300 is further described in U.S. patent application Ser. No. 09/999,891.

The optical element 316 may be, for example, a filter that reflects light in a selected wavelength range. The filter 316 may have a reflective coating on a first surface 316a and an antireflective coating on a second surface 316b. Such an optical element 316 may permit the device to operate as a multiplexer (MUX) or, a demultiplexer (DMUX), or an optical add-drop multiplexer (OADM). In an example illustrating the operation of a MUX, light at one wavelength, or wavelength range, may enter the device through the second fiber 308, and be reflected by the optical element 316 towards the first fiber 306. Light at another wavelength, or wavelength range, may enter the device through the third fiber 334 and be transmitted to the first fiber 306 through the optical element 316. Thus, the output from the first fiber 306 is a combination of the light entering the device from both the second and third fibers 308 and 334.

In an example illustrating the operation of a DMUX, light having components at two different wavelengths, or wavelength ranges, may enter the device through the first fiber 306. Light at one of the wavelengths or wavelength ranges is reflected by the optical element 316 towards the second fiber 308 while light at the other wavelength or wavelength range is transmitted to the third fiber 334.

The light entering the device may, instead of comprising two wavelengths or wavelength ranges, include several different wavelengths to form a multiple channel optical communications signal. The optical element may be set to reflect light in one or more particular channels, and transmit light in the other channels. Therefore, depending on the direction of the light entering the device and the range of wavelengths over which the optical element 316 is reflective, the device may drop one or more channels from the multiple channel signal or may add one or more channels to the multiple channel signal.

Optionally, another element 340 may be included in the device. For example, the other element 340 may be an optical isolator, a circulator or a filter element, a polarizer or an attenuator.

In an example of a device 300 as illustrated in FIG. 3, the fibers 306 and 308 may have a diameter of around 125 μm and are set in the dual-fiber ferrule 304 at a center-to-center spacing of 125 μm. The lenses 302 and 332 may be aspherical lenses having a focal length in the range 1.5–2.5 mm, and so θ3 has a value of approximately 1.5°–2.5°. The optical element 316 may be based on a glass substrate, for example BK7 or B270 glass, and have a wedge angle of around 2°–5°. It is to be understood that the values for the various components provided in this paragraph are provided for illustrative purposes only, and are not intended to limit the invention in any way. The arrangement illustrated in FIG. 3 may also be adapted for use in higher-level modules that use multiple dual-fiber or multiple-fiber collimator assemblies. Specifically, a parallel transmitted beam may permit a narrower acquisition range for further alignments.

Figure 4:
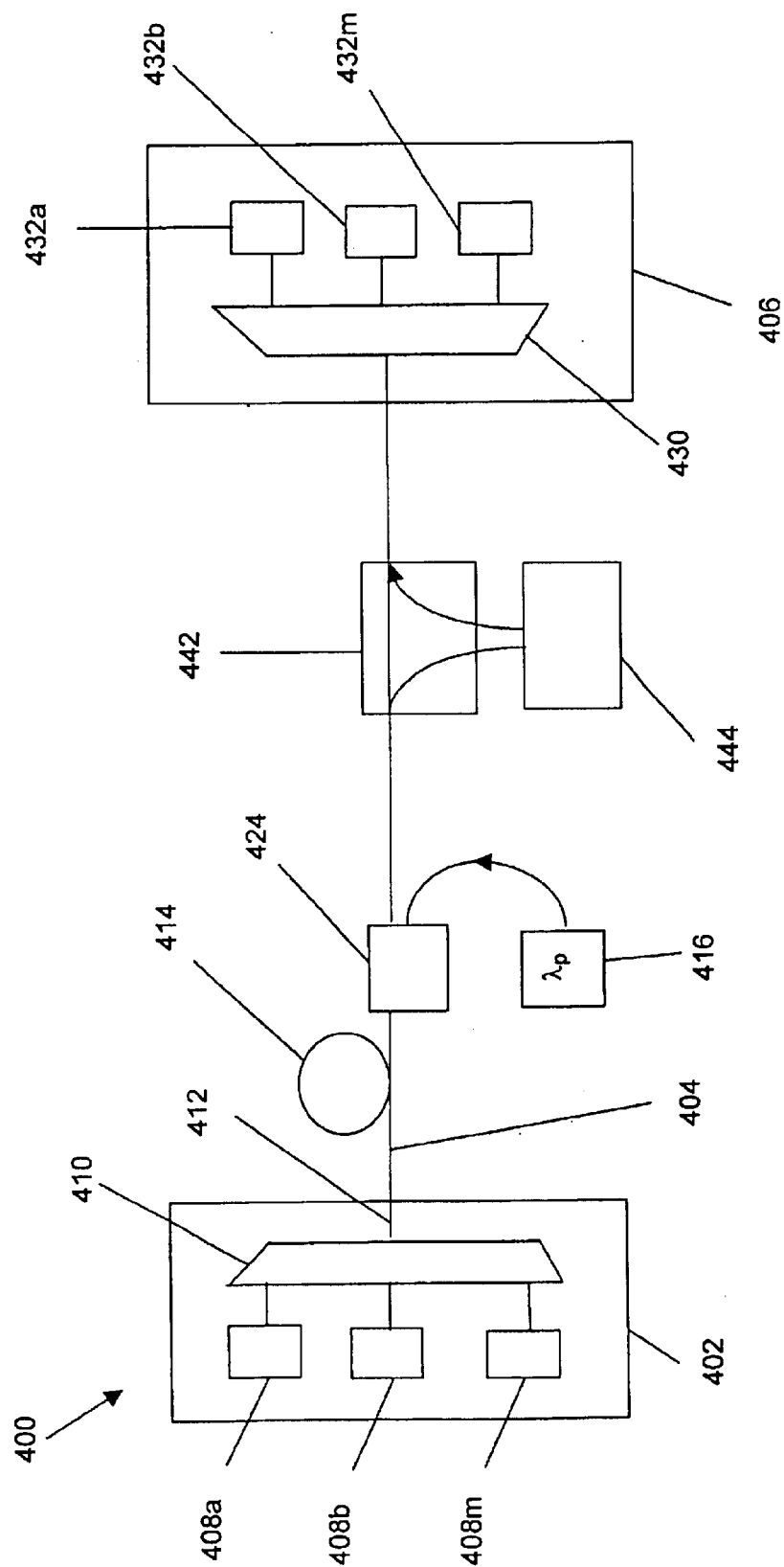
FIG. 4 schematically illustrates an embodiment of an optical fiber unit according to the present invention.

A schematic of an embodiment of an optical communications system 400 that includes the present invention is presented in FIG. 4. A DWDM transmitter 402 directs a DWDM signal having m channels through a fiber communications link 404 to a DWDM receiver 406.

In this particular embodiment of DWDM transmitter 402, a number of light sources 408a, 408b–408m generate light at different wavelengths, λa, λb ... λm, corresponding to the different optical channels. The light output from the light sources 408a–408m is combined in a DWDM combiner unit 410, or multiplexer (MUX) unit to produce a DWDM output 412 propagating along the fiber link 404.

Light sources 408a–408m are typically laser sources whose output is externally modulated, although they may also be modulated laser sources, or the like. It will be appreciated that the DWDM transmitter 402 may be configured in many different ways to produce the DWDM output signal. For example, the MUX unit 410 may include an interleaver to interleave the outputs from different multiplexers. Furthermore, the DWDM transmitter 402 may be equipped with any suitable number of light sources for generating the required number of optical channels. For example, there may be twenty, forty or eighty optical channels, or more. The DWDM transmitter 402 may also be redundantly equipped with additional light sources to replace failed light sources.

Upon reaching the DWDM receiver 406, the DWDM signal is passed through a demultiplexer unit (DMUX) 430, which separates the multiplexed signal into individual channels that are directed to respective detectors 432a, 432b–432m.

The fiber link 404 may include one or more fiber amplifier units 414, for example rare earth-doped fiber amplifiers, Raman fiber amplifiers or a combination of rare earth-doped and Raman fiber amplifiers. The pump light may be introduced to the fiber amplifier 414 from a pump laser unit 416 via a dual-fiber collimator (DFC) to single fiber unit 424, similar to the device described in FIG. 2. The amplifier unit 414 may be pumped with counter-propagating light, as shown, and/or with co-propagating light.

The fiber link 404 may include one or more optical add/drop multiplexers (OADM) 442 for directing one or more channels to a local fiber system 444. The local loop 444 may also direct information back to the OADM 442 for propagating along the fiber link 404 to the DWDM receiver 406. It will be appreciated that the information directed from the local fiber system 444 to the OADM 442 need not be at the same wavelength as the information directed to the local loop 444 from the OADM 442. Furthermore, it will be appreciated that the OADM 442 may direct more than one channel to, and may receive more than one channel from, the local system 444. The amount of light being added to the fiber link 404 from the local system 444 may be monitored by a channel monitor to ensure that the light in the channel (s) being added to the fiber link has an amplitude similar to that of the existing channels.

As noted above, the present invention is applicable to fiber optic devices and is believed to be particularly useful in fiber optic devices that use one or more dual-fiber collimator units. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A dual fiber collimator unit, comprising:
   a dual-fiber ferrule having an angled end face and having a ferrule axis;
   first and second optical fibers mounted in the ferrule with respective first and second fiber ends approximately coplanar with the angled end face, the first fiber end corresponding to a first position along the ferrule axis and the second fiber end corresponding to a second position along the ferrule axis, the first and second positions along the ferrule axis being different; and
   a focusing unit having an optical axis coincident with the ferrule axis, the focusing unit being positioned relative to the ferrule so that the front focal length of the focusing unit terminates at a third position along the ferrule axis, the third position being approximately midway between the first and second positions so that light diverging from the first fiber passes from the focusing unit as a converging beam.

2. A device as recited in claim 1, wherein the ferrule axis and a line normal to the angled end face define a first plane, and a line between the first and second fiber ends is parallel to the first plane.

3. A device as recited in claim 1, wherein the focusing unit has a back focal length and further comprising a wedged optical element disposed on the optical axis and having a first surface separated from the focusing unit by a distance approximately equal to the back focal length.

4. A device as recited in claim 3, wherein the wedged optical element has a second surface disposed at an angle to the first surface, light transmitted through the focusing unit and incident on the first surface of the wedged optical element being refracted by the second surface so as to be parallel to the optical axis.

5. A device as recited in claim 4, wherein the first surface of the wedged optical element is provided with an optical coating that transmits light from the first optical fiber at a first wavelength and reflects light from the first optical fiber at a second wavelength, through the focusing unit to the second optical fiber.

6. A device as recited in claim 1, wherein the focusing unit has a back focal length and further comprising an optical element disposed on the optical axis having a reflective surface separated from the focusing unit by a distance approximately equal to the back focal length, at least some of the light from the first optical fiber being reflected by the reflective surface to the second optical fiber.

7. A device as recited in claim 6, wherein the light reflected from the reflecting surface to the second optical fiber is convergent.

8. A device as recited in claim 6, further comprising a third optical fiber, wherein light transmitted through the reflecting surface from the first optical fiber propagates to the third optical fiber.

9. A device as recited in claim 8, wherein light propagates from the third optical fiber through the reflecting surface to the second optical fiber.

10. A device as recited in claim 1, further comprising a reflecting surface disposed to receive the converging light from the first fiber via the focusing unit, the reflecting surface reflecting at least some of the converging light to the second fiber via the focusing unit.

11. An optical system, comprising:
    an optical transmitter producing output light in a signal wavelength band;
    an optical receiver receiving at least a portion of the output light; and
    an optical fiber link coupling between the optical transmitter and the optical receiver, the optical fiber link including a fiber optic device having a dual fiber collimator comprising
    a dual-fiber ferrule having an angled end face and having a ferrule axis;
    first and second fibers mounted in the ferrule with respective first and second fiber ends approximately coplanar with the angled end face, the first fiber end corresponding to a first position along the ferrule axis and the second fiber end corresponding to a second position along the ferrule axis, the first and second positions along the ferrule axis being different; and
    a focusing unit having an optical axis coincident with the ferrule axis, the focusing unit being positioned relative to the ferrule so that the front focal length of the focusing unit terminates at a third position along the ferrule axis, the third position being approximately midway between the first and second positions, so that light diverging from the first fiber passes from the focusing unit as a converging beam.

12. A system as recited in claim 11, further comprising one or more optical amplifier units disposed on the optical fiber link between the optical transmitter and the optical receiver.

13. A system as recited in claim 12, wherein one of the one or more optical fiber amplifier units includes a fiber amplifier integrated with the optical fiber link and includes a pump laser generating pump light at a pump wavelength, the pump light being coupled into the fiber optic link through fiber optic device.

14. A system as recited in claim 13, wherein the output light in the signal wavelength band propagates through in the optical fiber link in a first direction and the pump light coupled into the optical fiber link propagates along the optical fiber link in the first direction.

15. A system as recited in claim 13, wherein the output light in the signal wavelength band propagates through in the optical fiber link in a first direction and the pump light coupled into the optical fiber link propagates along the optical fiber link in a second direction opposite to the first direction.

16. A system as recited in claim 11, wherein the optical transmitter includes modulated light sources operating at different wavelengths and optical combining elements to combine outputs from the modulated light sources into a fiber output coupled to the optical fiber link.

17. A system as recited in claim 11, wherein the optical receiver includes optical separating elements to separate different wavelengths of light received from the optical fiber link and to direct light at different wavelengths to respective detectors.

18. A system as recited in claim 11, further comprising an optical add/drop multiplexer disposed on the optical fiber link, the fiber optic device comprising the add/drop multiplexer.

19. A method of controlling light in a dual fiber collimator unit, comprising:

propagating the light diverging from a first fiber, having a first fiber end, towards a focusing unit;

focusing the light from the first fiber with the focusing unit so as to produce a convergent beam;

reflecting the convergent beam; and focusing the reflected convergent beam with the focusing unit to a second fiber having a second fiber end disposed closer to focusing unit than the first fiber end; and positioning the focusing unit relative to the fiber ends so that the front focal length of the focusing unit terminates at a point on a collimator axis, the point being positioned along the collimator axis approximately midway between first and second positions along the axis that correspond to the longitudinal placement of the first and second fiber ends respectively.

20. A method as recited in claim 19, wherein reflecting the convergent beam includes reflecting the convergent beam with a reflecting element, and-further comprising transmitting some of the convergent beam through the reflecting element to a third optical fiber.

21. A method as recited in claim 20, wherein the reflecting element is wedged, and light transmitted through the reflecting element from the first fiber to the third optical fiber propagates parallel to a collimator axis.

22. A method as recited in claim 20, wherein the reflecting element reflects light at a first wavelength and transmits light at a second wavelength different from the first wavelength.

\* \* \* \* \*